United States Patent [19]
Ishibashi et al.

[11] Patent Number: 5,341,373
[45] Date of Patent: Aug. 23, 1994

[54] CONGESTION RELIEVING SYSTEM IN A COMMUNICATION SYSTEM

[75] Inventors: Ryoichi Ishibashi; Katsumi Sekine, both of Kawasaki, Japan

[73] Assignee: Fujitsu Limited, Kawasaki, Japan

[21] Appl. No.: 831,794

[22] Filed: Feb. 5, 1992

[30] Foreign Application Priority Data

Feb. 5, 1991 [JP] Japan ................... 3-035519
Feb. 5, 1991 [JP] Japan ................... 3-035520

[51] Int. Cl.⁵ .................................. H04L 12/56
[52] U.S. Cl. .................... 370/85.9; 370/94.1; 370/110.1
[58] Field of Search ............ 370/94.1, 110.1, 85.9, 370/85.1, 60, 60.1, 94.2, 85.11, 67

[56] References Cited

U.S. PATENT DOCUMENTS 5,001,707  3/1991  Kositpaiboon et al. ........... 370/85.6
5,062,106  10/1991 Yamazaki et al. ................. 370/60
5,164,938  11/1992 Jurkevich et al. ................. 370/84

Primary Examiner—Douglas W. Olms
Assistant Examiner—Min Jung
Attorney, Agent, or Firm—Staas & Halsey

[57] ABSTRACT

A congestion relieving system in a communication system includes a local switch (62a) and a customer station including a network terminator (64a) connected to the local switch (62a) and plural data receiving/transmitting units (65) connected to the network terminator (64a) through buses (67D and 67U) conformable to a DQDB protocol, the local switch (62a) includes a congestion relieving signal generating unit for generating a congestion relieving signal when congestion is detected. The congestion relieving signal is inserted, as a request bit, into a request bit area in the cell having a format conformable to the DQDB protocol. The cell is then transmitted from the local switch (62a) through the network terminator (64a) to the data receiving/transmitting units (65), and each data receiving/transmitting unit (65) is restricted, under the DQDB protocol, to transmit data, when the data receiving/transmitting unit (65) receives the request bit.

11 Claims, 13 Drawing Sheets

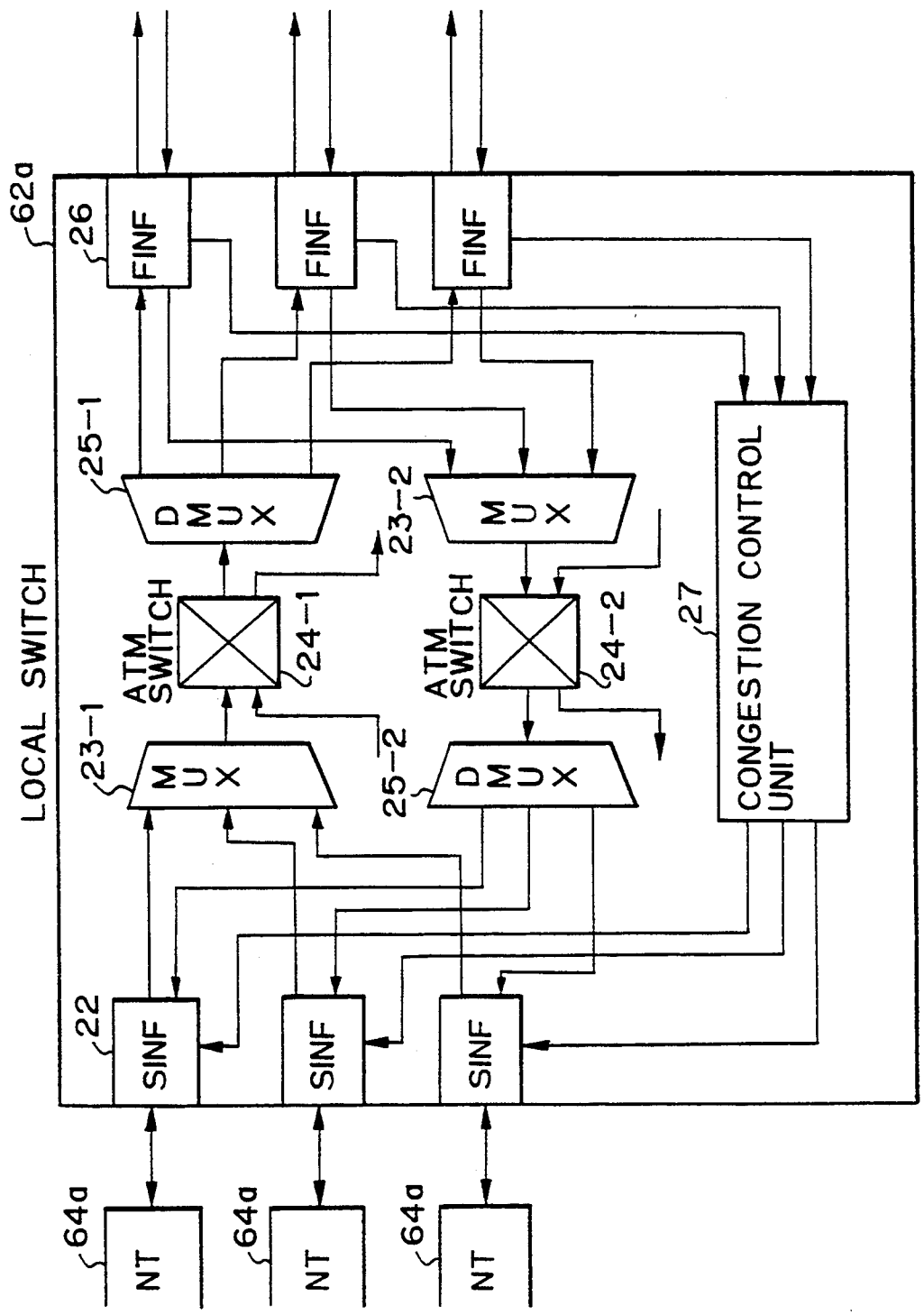

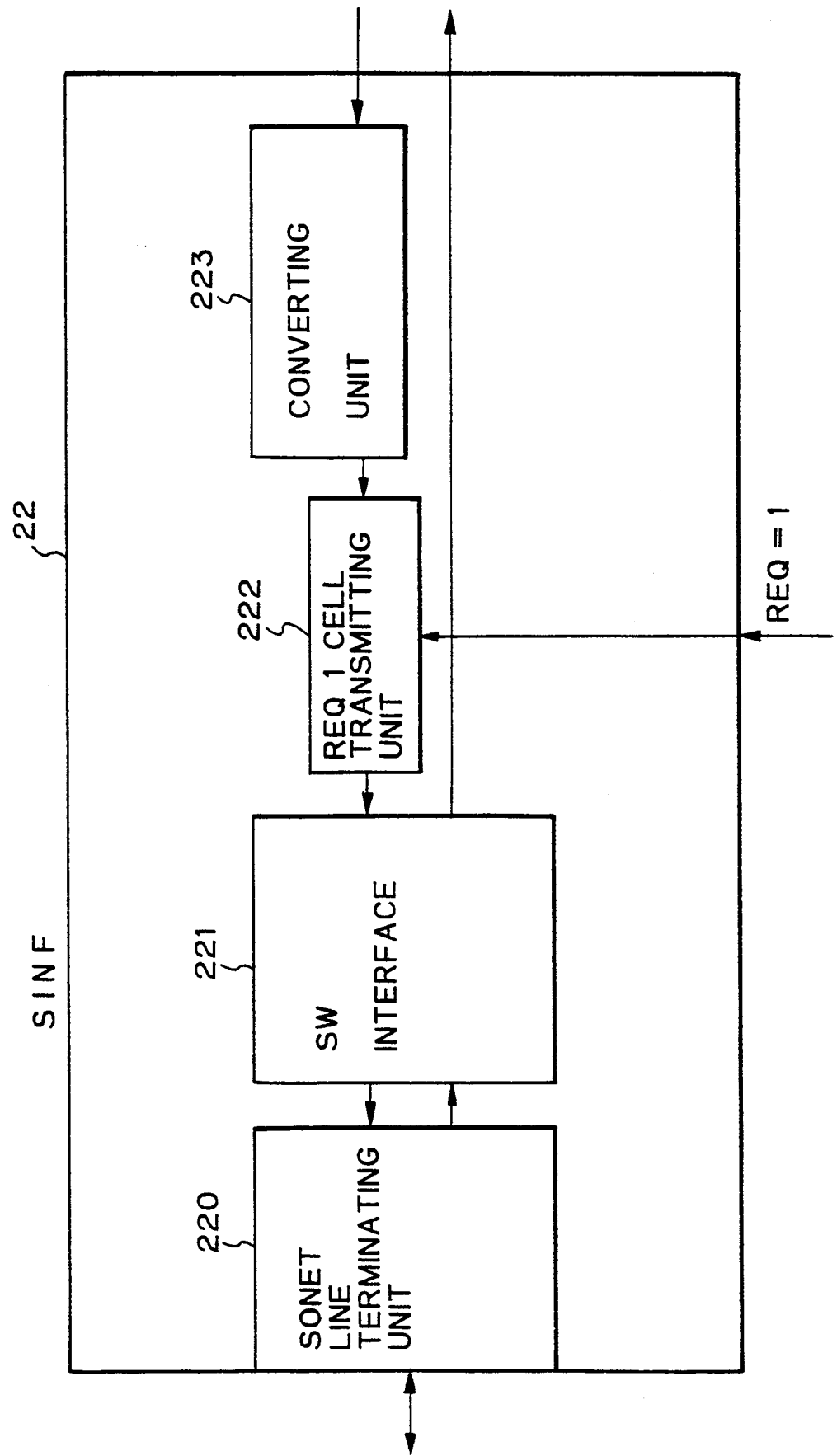

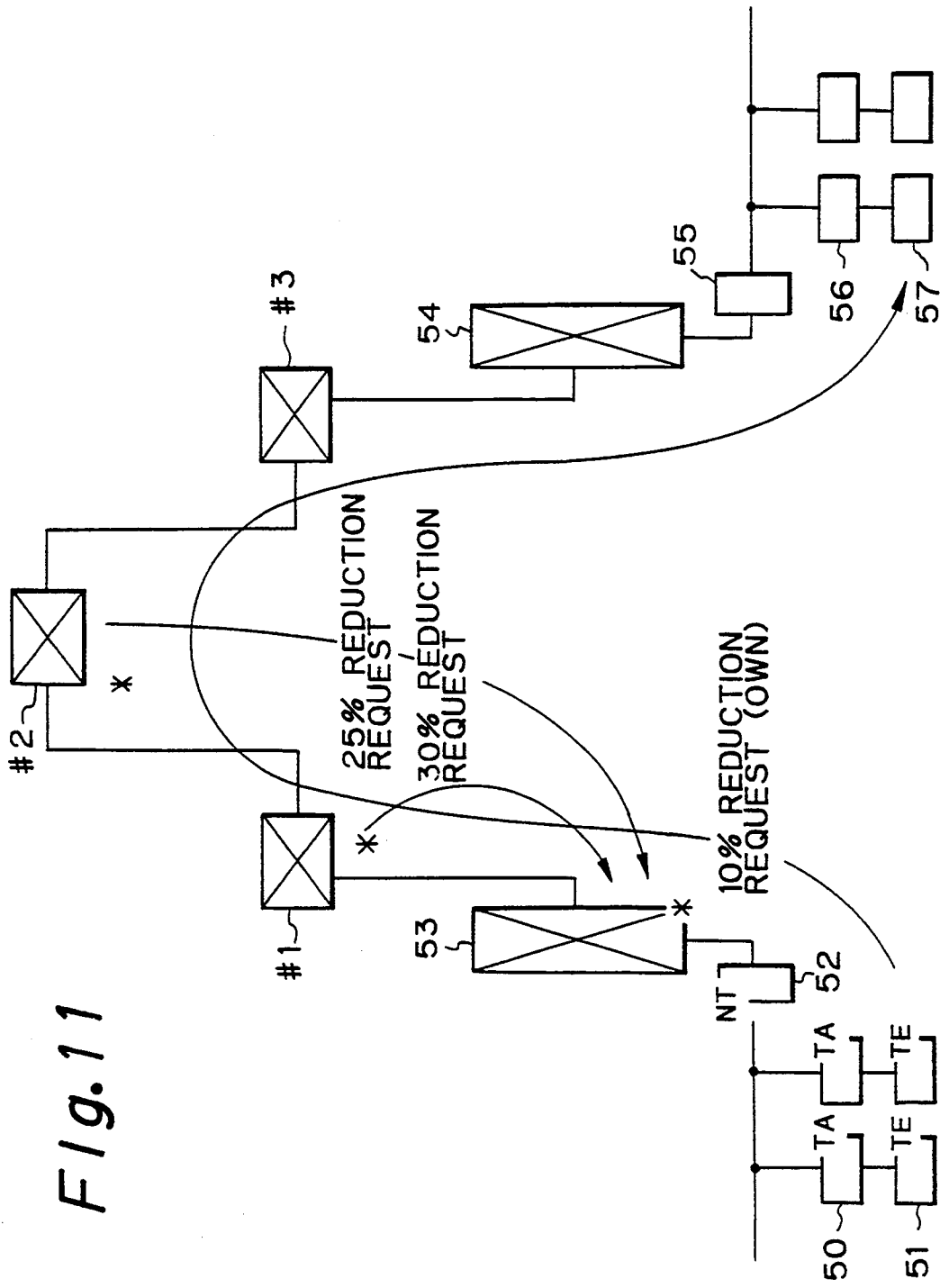

Fig. 12

121: THE NODE IN WHICH CONGESTION HAS OCCURRED OUTPUTS A RESTRICTION REQUEST TO THE LOCAL SWITCH WHICH IS TRANSMITTING CELLS TO THE NODE

122: LOCAL SWITCH SELECTS THE MAXIMUM RESTRICTION REQUEST

123: LOCAL SWITCH SELECTS MAXIMUM REQUEST, CELLS WITH REQUEST BITS = 1 ARE SENT THROUGH SUBSCRIBER LINE

124: REQUEST COUNTER IN TA or TE COUNTS UP CELL HAVING REQUEST BITS = 1 OUTPUT FROM LOCAL SWITCH

125: UNUSED CELLS RECEIVED FROM UP SUBSCRIBER LINE TO LOCAL SWITCH AND ARE DISCARDED

126: CONGESTION IN THE NODE FROM WHICH RESTRICTION HAS BEEN REQUIRED IS RELIEVED

Fig. 13

131: RECEIVE CELL TRANSMISSION RESTRICTION. REQUESTS FROM PLURAL NODES (INCLUDING LOCAL SWITCH)

132: SELECT THE MAXIMUM RATE IN RESTRICTION REQUESTS

133: TRANSMIT REQ = 1 TO A CELL TRANSMITTED TO THE DOWN LINE, IN ACCORDANCE WITH THE SELECTED RATE

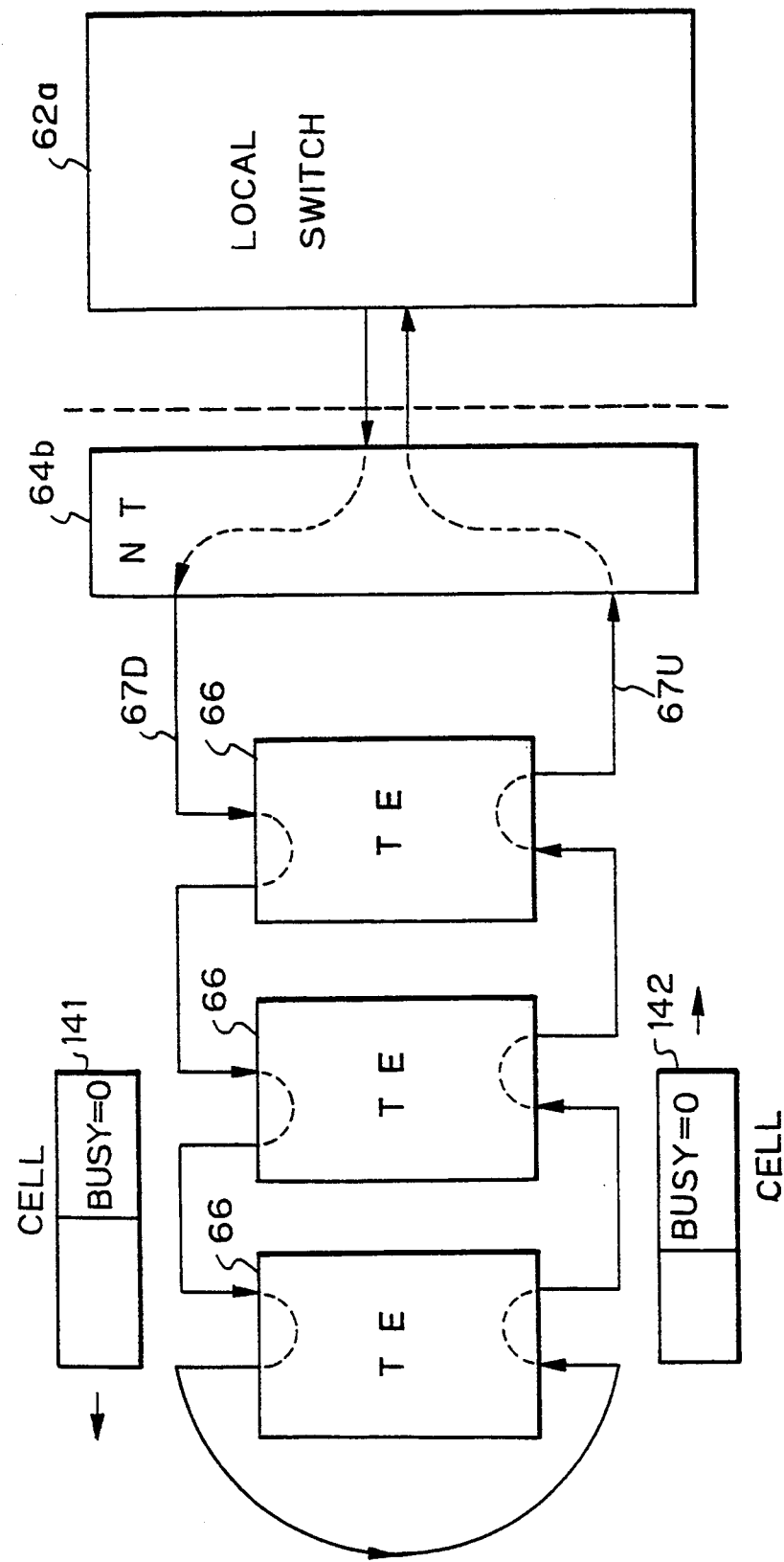

CONGESTION RELIEVING SYSTEM IN A COMMUNICATION SYSTEM

BACKGROUND OF THE INVENTION (1) Field of the Invention

The present invention relates to a congestion relieving system in a communication system, and more particularly, to a congestion relieving system in a broad band ISDN in which data is transferred by using ATM cells, and which is connected to a customer station through a network terminator and a bus conformable to a DQDB protocol.

(2) Description of the Related Art

The research of the broad-band ISDN (Integrated Services Digital Network) has been developed to put or construct an ISDN in which broad-band communication such as video communication and so forth is possible for practical use. The broad-band ISDN is currently realized by using an ATM (Asychronous Transfer Mode). In the ATM, data is transferred by dividing it into fixed-length short packets called cells. The cells are exchanged and transferred by an ATM exchange or a node.

In the ATM, a circuit or, in other words, a line between a sender and a receiver, is not always provided at any time, but a virtual circuit or virtual line is provided through which a necessary ATM cell is transmitted. Therefore, a plurality of virtual circuits commonly have a single transmission line. In this multiplication, a transmission line method called a statistical multiplication is employed. It is necessary to manage the statistical multiplication in such a way that the total data multiplied on a single transmission line does not exceed the capacity of the transmission line. By this, an effect of the multiplication is generated so that the efficient use of the circuit can be increased. Techniques has been developed to treat congestion when it occurs. For subscribers connected to such a broad-band ISDN, a plurality of data receiving/transmitting devices called terminal equipments or terminal adapters in a customer station are connected through a bus. As a configuration of the bus, a DQDB (Distributed Queue Dual Bus) is considered to be favorable. The present invention relates to a congestion relieving system in an ISDN in which the communication between a local switch and each of the terminal equipments or terminal adapters is carried out in accordance with the DQDB protocol.

In the broad-band ISDN communication employing the DQDB protocol in the customer station side, congestion may be generated in an apparatus in the network side. The apparatus in which congestion may be generated may be an ATM exchange, a local switch, or any processing device for processing ATM cells. To relieve congestion generated in the apparatus at the network side, it can be considered to restrict a subscriber, which is sending ATM cells to the apparatus, in which the congestion has occurred, to transmit a cell.

In a conventional congestion relieving system, a network terminator inserts busy bits equal to "1" into busy bit areas of cells in accordance with a required rate of restriction of cells to be transmitted. This conventional system is disclosed in the prior U.S. application Ser. No. 683,043, filed on Apr. 10, 1991. The cells having the busy bits equal to "1" are deemed as those being used by the terminal equipments or the terminal adapters. Therefore, the terminal equipment or terminal adapter does not insert data into these cells with the busy bits ="1". Accordingly, the cells with the busy bits ="1" inserted by the network terminator have no destination so that, when these cells are received by an apparatus such as an ATM exchange and so forth, these cells are deemed invalid and they are discarded. As a result, the number of cells to be transmitted to the apparatus, such as the ATM exchange in which the congestion has been generated, is decreased and the congestion is relieved.

The network terminator is included in the customer station. Therefore, it is desired that the network terminator be as inexpensive as possible. In the above described conventional congestion relieving system, however, there is the disadvantage that the construction of the network terminator located at the up-stream of the up-signal bus is complex. Namely, the network terminator must function to send an empty cell which is without data but with the busy bit ="1" to the up-stream end of the up-signal bus. In other words, the network terminator must function to insert the busy bit ="1" in the cell. This function raises the cost of the network terminator.

SUMMARY OF THE INVENTION

Accordingly, an object of the present invention is to provide a congestion relieving system in a communication system which can relieve a congestion generated in an exchange or a node in a network out of the customer station, without providing an additional mechanism in a customer station.

To attain the above object, there is provided, according to the present invention, a congestion relieving system for relieving congestion in a communication system. The communication system comprises a local switch and a customer station. The customer station includes a network terminator connected to the local switch and a plurality of data receiving/transmitting units connected to the network terminator through buses conformable to a DQDB protocol. The local switch comprises congestion determining unit for determining whether or not congestion occurs in or out of the local switch, congestion relieving signal generating unit, operatively connected to the congestion determining means, for generating a congestion relieving signal when congestion is detected by the congestion determining unit, and a cell transmitting unit, operatively connected to the congestion relieving signal generating means, for transmitting a cell to the network terminator. The congestion relieving signal is inserted, as a request bit, into a request bit area in the cell having a format conformable to the DQDB protocol. The cell is transmitted from the local switch through the network terminator to the data receiving/transmitting units. Thus, each of the data receiving/transmitting units is restricted under the DQDB protocol, to transmit data, when the data receiving/transmitting unit receives the request bit.

According to an aspect of the present invention, each of the data receiving/transmitting units comprises a request bit transmitting unit for transmitting a request bit when the data receiving/transmitting unit under consideration requests the transmission of data. The request bit is inserted into a request bit area in the cell. The data receiving/transmitting units further comprises a busy bit transmitting unit for transmitting a busy bit. The busy bit is inserted into a busy bit area in the cell at the time when the data transmitting/receiving unit under consideration inserts data into the cell. The data receiving/transmitting unit still further comprises a request counter for counting up in response to request bits passing through a down-signal bus from the network terminator to the data receiving/transmitting unit under consideration, and for counting down, in response to inverted busy bits passing through un up-signal bus from the data receiving/transmitting unit under consideration to the network terminator, before the data receiving/transmitting unit under consideration transmits the request bit. The data receiving/transmitting unit still further comprises a down counter, operatively connected to the request counter, for loading the contents in the request counter when the data receiving/transmitting unit under consideration transmits the request bit, and for counting down the loaded contents to zero in response to the inverted busy bits in the cells passing through the down-signal bus from the data receiving/transmitting unit under consideration to the network terminator. Thus, the data receiving/transmitting unit under consideration is restricted to transmitting data until the contents in the down counter become zero.

According to still another aspect of the present invention, the cell is an ATM cell; and the communication system is a broad-band ISDN.

According to a further aspect of the present invention, the communication system further comprises at least one exchange connected to the local switch for generating congestion relieving request accompanied by a ratio of cells to be restricted. The local switch further comprises congestion control unit for generating congestion relieving request accompanied with a ratio of cells to be restricted when congestion occurs in the local switch. The congestion determining unit comprises a unit for selecting the maximum ratio among the ratios in the received congestion relieving requests from the at least one exchange and the congestion control unit in the local switch. The cell transmitting unit in the local switch comprises a unit for inserting the congestion restricting signal into cells with the selected maximum ratio.

According to a further aspect of the present invention, the end of the down-signal bus, connected in a sequence from the local switch to a plurality of the data receiving/transmitting units and for transmitting a cell sent from the local switch, is folded and connected to the top end of the up-signal bus, whereby the cells used in the down-signal bus are used as empty cells in the up-signal bus.

BRIEF DESCRIPTION OF THE DRAWINGS

The above object and features of the present invention will be more apparent from the following description of the preferred embodiments with reference to the accompanying drawings, wherein:

FIG. 9 is a diagram showing a detailed construction of a local switch in the system shown in FIG. 4;

FIG. 10 is a diagram of the construction of a subscriber line interface (SINF) in the local switch shown in FIG. 8;

FIG. 11 is a diagram showing a practical example in the generation of congestion in an ATM network system;

FIG. 12 is an operation flow of the total system according to an embodiment of the present invention;

FIG. 13 is a process flow in a local switch according to an embodiment of the present invention;

FIG. 14 is a diagram showing congestion relieving system according to another embodiment of the present invention.

DESCRIPTION OF THE PREFERRED EMBODIMENTS

For better understanding of the present invention, a conventional congestion relieving system in a broad-band ISDN will first be described with reference to FIGS. 1 to 3.

Figure 1:
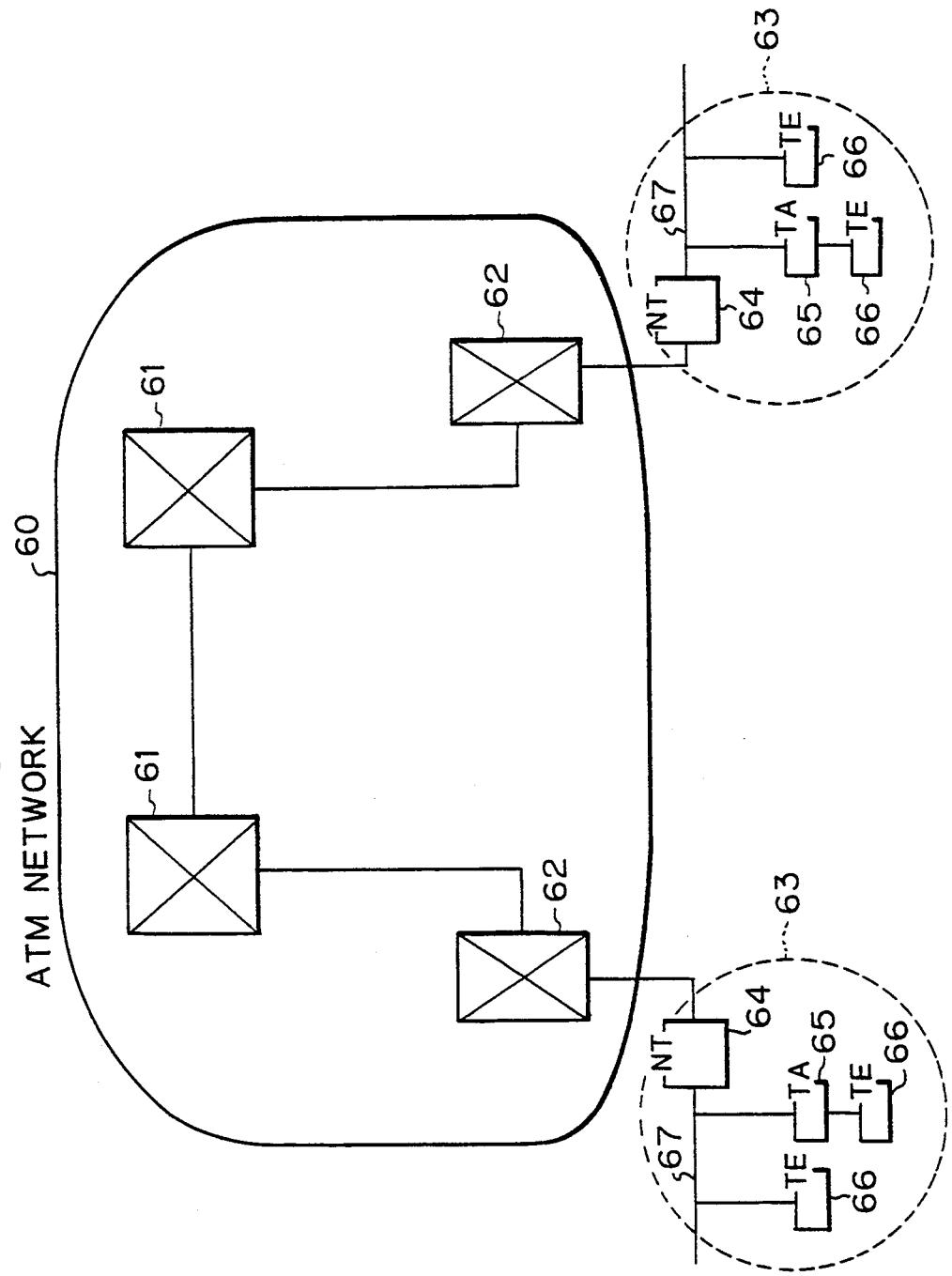
FIG. 1 is diagram of a conventional ATM network for explaining the background of the present invention.

FIG. 1 is a diagram showing an ATM network which is a broad-band ISDN. In the figure, 60 is the ATM network, 61 is an exchange (this also may accommodate a subscriber) in the ATM network 60, 62 is a local switch in the ATM network 60, and 63 is a customer station. As the customer station, there may be one having a constitution for accommodating various terminals such as a general subscriber, LAN, or a PBX (Private Branch Exchange). In the illustrated case, however, as the customer station, a predetermined number of terminal equipments (TE) 66 are connected in parallel through a bus 67 to a network terminator (NT) 64. When the terminal equipment (TE) 66 does not have an interface adapted to the ATM, the terminal equipment 66 is connected through a terminal adapter (TA) 65, which has an interface adapted to the ATM, to the network terminator (NT) 64.

Figure 2:
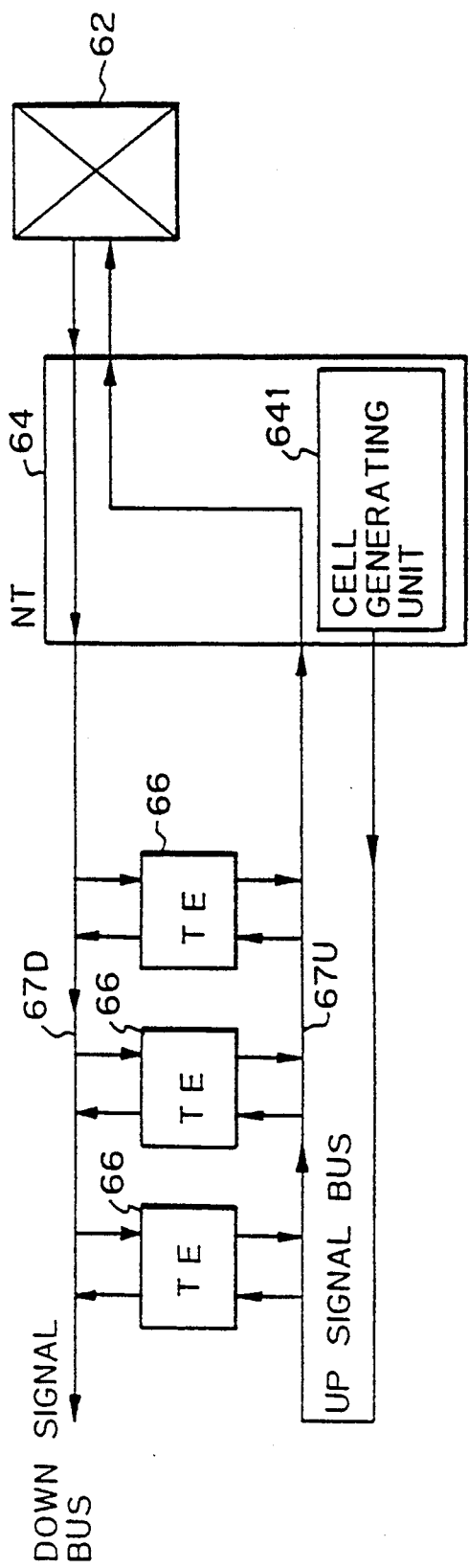
FIG. 2 is a diagram of a conventional customer station in the ATM network shown in FIG. 1.

FIG. 2 shows the construction of the conventional customer station for the ATM network. In the customer station for the ATM network, as shown in FIG. 2, a plurality of terminal equipments (TE) 66 or terminal adapters (TA) 65 are connected in parallel between an up-signal bus 67U and a down-signal bus 67D. The up-signal bus 67U and the down-signal bus 67D are connected to the network terminator (NT) 64. The network terminator (NT) 64 is connected through a line to the local switch 62. The configuration of the illustrated bus has a construction using the DQDB (Distributed Queue Dual Bus) protocol, which is considered to be favorable. The data transmitting and receiving processes in each terminal equipment or terminal adapter according to the DQDB protocol will be described later in detail with reference to an embodiment of the present invention.

As shown in FIG. 2, the conventional network terminator 64 includes a cell generating unit 641. The cell generating unit 641 generates empty cells which are sent to the up-stream of the up-signal bus 67U, when congestion occurs in the local switch 62 or in the exchange 61 (see FIG. 1). Each of the empty cells does not include valid data but includes a busy bit ="1" in its busy bit area. Inserting the busy bit ="1" into the busy bit area in the empty cell is a problem of the conventional system. Namely, to insert the busy bit ="1", the network terminator (NT) 64 must recognize the position of each cell in a frame. This recognition needs an additional hardware in the network terminator.

Figure 3:
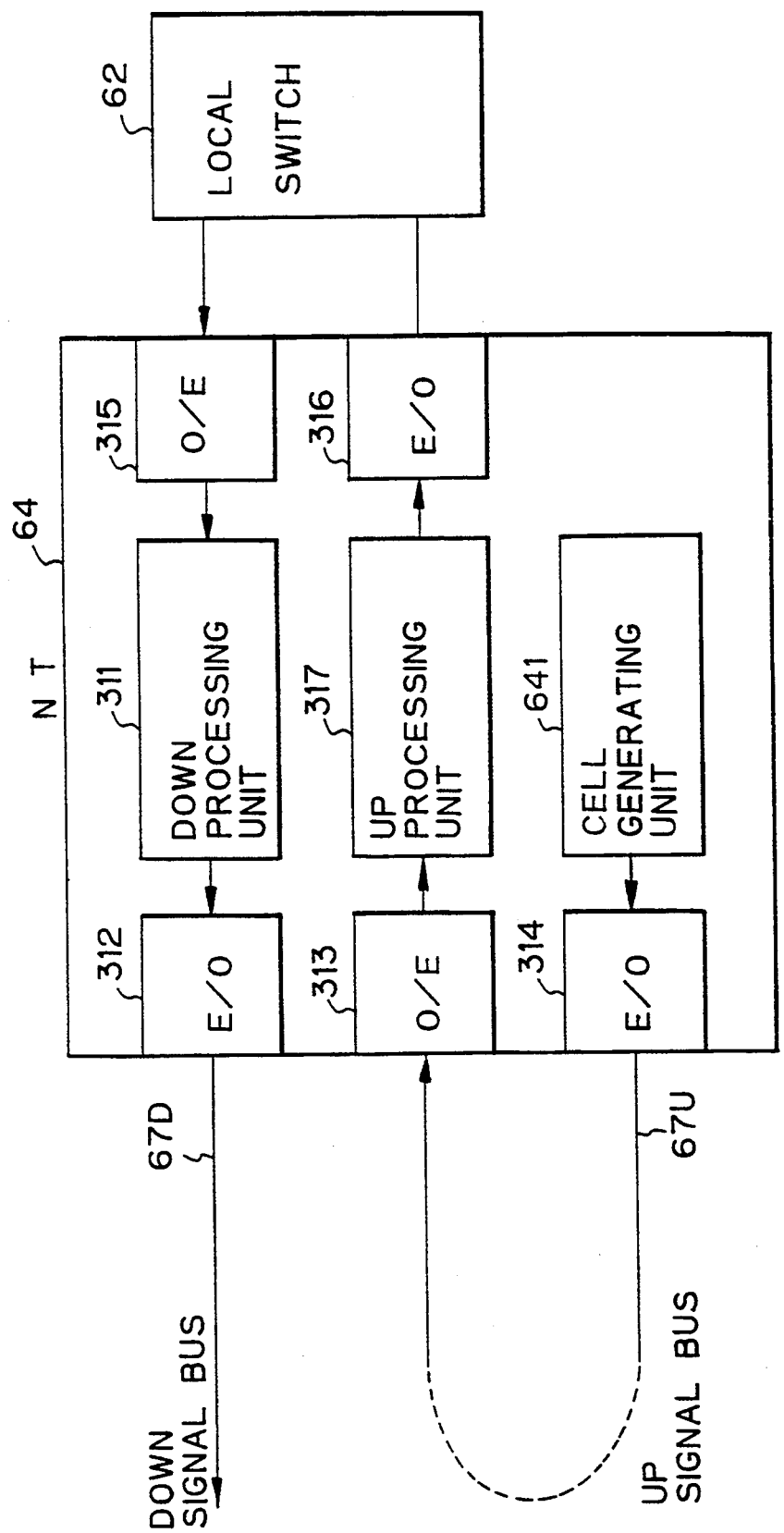
FIG. 3 is a diagram of a conventional network terminator in the customer station shown in FIG. 2.

FIG. 3 shows the conventional network terminator (NT) 64 in more detail. As shown in FIG. 3, with respect to a down -signal side, an optical signal is output from the local switch 62, and input into the network terminator (NT) 64, in which the optical signal is converted into an electric signal by an optic/electric converter (O/E) 315, is processed by a down processing unit 311, is converted into an optical signal by an electric/optic converter (E/O) 312, and is output to the down-signal bus. On the other hand, the cell generating unit 641 generates an empty cell when congestion occurs in, for example, the local switch 62. The empty cell is an electric signal. The electric signal is converted into an optical signal by an electric/optic converter (E/O) 314. The optical signal is transmitted through the up-signal bus 67U. Each of the terminal equipments (TE) 66 or the terminal adapters (TA) 65 connected to the up-signal bus 67U detects the busy bit ="1" in the transmitted empty cell assuming that the empty cell includes valid data sent from some terminal equipment (TE) 66 or terminal adapter (TA) 65, resulting in that no terminal equipment (TE) 66 or terminal adapter (TA) 65 can insert a request bit into the empty cell so that-, when the empty cell is received by the local switch 62, the empty cell is discarded. Thus, the congestion is relieved.

The bus consists of a down-signal bus 67D through which a cell from the NT 64 is transmitted and an up-signal bus 67U through which a cell with transmitting data inserted at the TA or TE into an empty cell from the NT 64 is transmitted.

The above-described conventional congestion relieving system has problems as described before, namely, the conventional network terminator (NT) 64 has a complex construction so that it is expensive.

Figure 4:
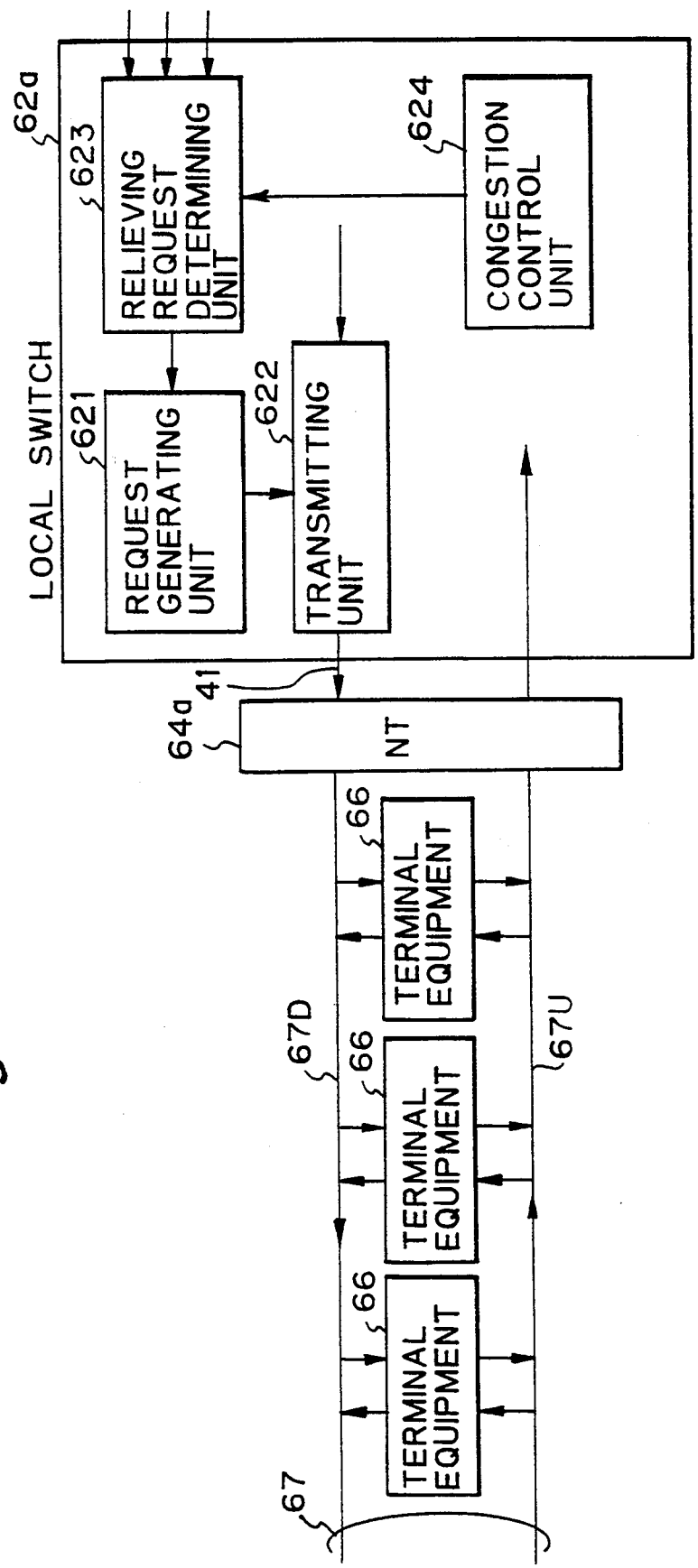
FIG. 4 is a diagram of congestion relieving system according to an embodiment of the present invention.

Embodiments of the present invention will now be described. FIG. 4 is a diagram showing congestion relieving system according to an embodiment of the present invention. In the figure, the same reference symbols represent the same parts in the conventional system shown in FIG. 1. In FIG. 4, the terminal equipments (TE) 66 are connected between the up-signal bus 67U and the down-signal bus 67D. Instead of the terminal equipments (TE) 66, terminal adapters (TA) 65, or in general, data receiving/transmitting units may be connected between the up-signal bus 67U and the down-signal bus 67D. In the following, for the sake of simplicity of explanation and drawings, only the terminal equipments (TE) 66 are connected. The buses 67D and 67U are conformable with the DQDB protocol. These buses 67U and 67D are connected to a network terminator 64a. The terminal equipments 66, the buses 67U and 67D, and the network terminator (NT) 64a constitute a customer station such as an office floor, LAN, private branch exchange, and so forth. The network terminator (NT) 64a is connected to a local switch 62a through a subscriber line 41. The local switch 62a is included in a broad-band ISDN. The local switch 62a includes a request generating unit 621, a transmitting unit 622, congestion relieving request determining unit 623, and congestion control unit 624.

According to the embodiment of the present invention, when congestion occurs in a node such as an exchange, the local switch 62a, or any other processing unit, the node gives the congestion relieving request determining unit 623 a congestion relieving request. The congestion relieving request determining unit 623 then drives the request generating unit 621 to generate congestion relieving request signal ="1". The congestion relieving request signal from the request generating unit 621 is supplied to the transmitting unit 622. In the transmitting unit 622, the congestion relieving request signal ="1" is inserted into a request bit area in a cell which has a data format conformable with the DQDB protocol. Then, the transmitting unit 622 transmits the cell, including the congestion relieving request signal ="1" in the request bit area, through the subscriber line 41 and the network terminator (NT) 64a to the down-signal bus 67D. Each terminal equipment (TE) 66 generates a request bit ="1" when it wants to send data, and generates a busy bit ="1" when it actually sends data. The request bit ="1" is inserted into the request bit area in an empty cell passing through the down-signal bus 67D. The busy bit ="1" is inserted into a busy bit area in an empty cell passing through the up-signal bus 67U when data is inserted into the empty cell. The busy bit of "1" is cleared to "0" when the cell is received by the destination. Each terminal equipment (TE) 66 has a request counter for counting up in response to the request bit on the down-signal bus 67D and for counting down in response to a busy bit of "0" on the up-signal bus 67U, so that the request counter represents the number of terminal equipments, located on the side of the network terminator (NT) 64a with respect to the terminal equipment under consideration. The above-mentioned terminal equipments have generated the requests to transmit data but have not yet transmitted data. Since the congestion relieving request signal generated from the request generating unit 621 is inserted in the request bit area, the content of the request counter in each terminal equipment (TE) 66 does not become zero. Therefore, all of the terminal equipments (TE) 66 are restricted to transmit data.

Figure 5:
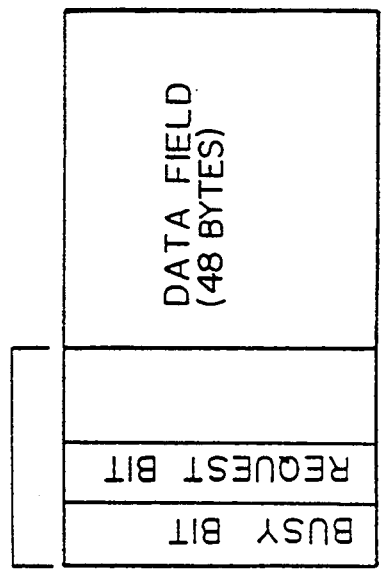
FIG. 5 is a diagram of a cell transmitted through buses in the customer station shown in FIG. 4.

The DQDB protocol is used for a competition control of the terminal equipments (TE) 66 to access the up-signal bus 67U. According to the DQDB protocol, the cell has the construction shown in FIG. 5. Namely, the total cell length is 53 bytes including a header of 5 bytes and a data field of 48 bytes, which has been recommended by CCITT. According to the DQDB protocol, two bits in a GFC (General Flow Control) field (4 bits) in the header are allocated to be a busy bit and a request bit to be used for the competition control. The request bit represents whether or not the other terminal equipment (TE) 66 is requesting to transmit data. Namely, the request bit ="1" is inserted into the cell passing through the terminal equipment (TE) 66 requesting to transmit data. The busy bit represents whether or not valid data is included in the cell, namely whether the cell is being used by the other terminal equipments (TE) 66. When the terminal equipment (TE) 66 inserts data into the cell, the busy bit equal to "1" is inserted into the busy bit area.

Figure 6:
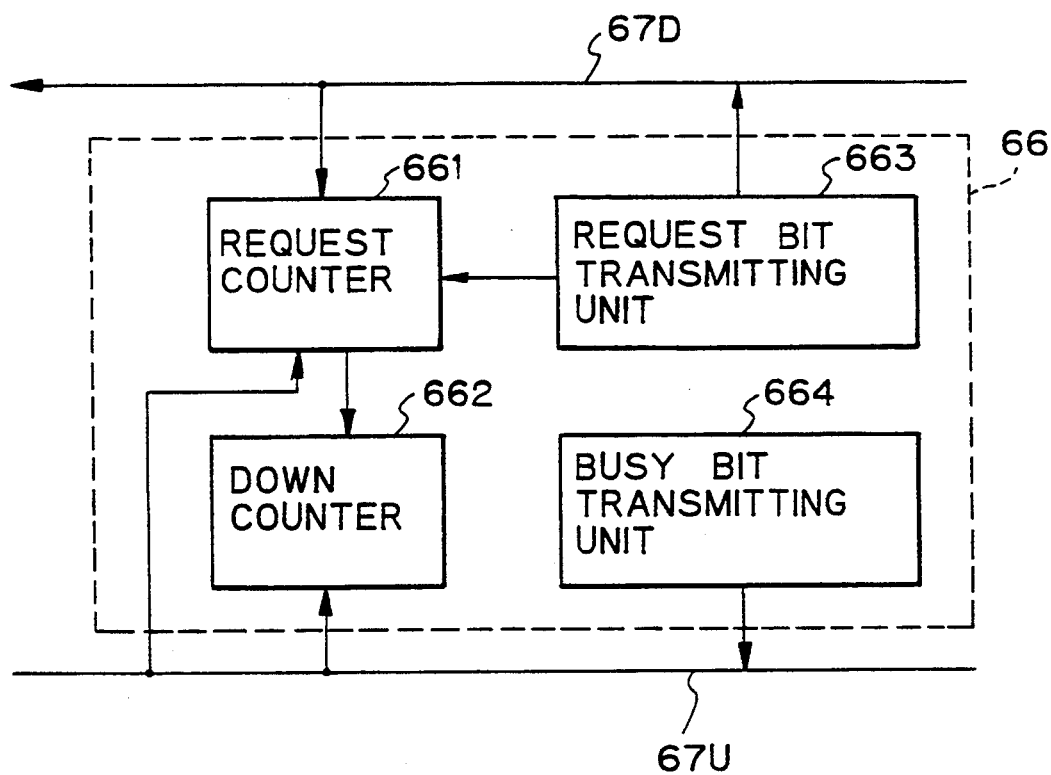
FIG. 6 is a diagram of the terminal equipment (TE) 66 in FIG. 4.

The request bit is sent through the down-bus to inform the terminal equipments (TE) 66 on the downstream side with respect to the terminal equipment (TE) 66, which is requesting the transmission of data, that it has a request to transmit data, namely it has data to be inserted into a cell. In other words, to inform the request to transmit data, the terminal equipment (TE) 66 inserts "1" into the request bit area in a cell. Each terminal equipment (TE) 66 has a request counter (RC) 661, a down counter (DC) 662, a request bit transmitting unit 663, and a busy bit transmitting unit 664 as shown in FIG. 6.

The operation of the request counter (RC) 661 and the down counter (DC) 662 is described with reference to FIG. 7. In FIG. Y, before the terminal equipment (TE) 66 under consideration generates the request bit ="1" from the request bit transmitting unit 663, the state is called an idle state 80. In this idle state 80, the request counter (RC) 661 in the terminal equipment 66 under consideration counts up the number of the request bits transmitted through the down-signal bus 6YD to the terminal equipment under consideration and counts down the number of busy bits ="0" transmitted through the up-signal bus 67U to the terminal equipment 66 under consideration.

When the terminal equipment (TE) 66 under consideration generates the request bit ="1" from the request bit transmitting unit 663, at step 81, the contents in the request counter (RC) 661 are loaded into the down counter (DC) 662, and the contents in the request counter (RC) 661 are reset to zero, and then, the request counter (RC) 661 counts up the number of the request bits transmitted through the down-signal bus 67D to the terminal equipment under consideration, but does not count down the number of the busy bits ="0".

At step 83, the down counter (DC) 662 counts down in response to the busy bit ="0" on the up-signal bus 67U to zero. Thus, the state becomes a ready state at step 82. In this ready state (step 82), the terminal equipment (TE) 66 under consideration can transmit data. Thus, at step 84, a cell is transmitted from the terminal equipment (TE) 66 under consideration. Since the request bits include the congestion relieving request signal when congestion occurs in the local switch 62a or in an ATM exchange, the request counter in each terminal equipment (TE) 66 is not cleared so that each terminal equipment (TE) 66 is restricted to transmit data. Thus, the congestion is relieved.

The above-described operation is summarized as follows. As shown in FIG. 7, at first, in the idle state 80, when the necessity to transmit a cell is generated so that a request to transmit data is generated, the request (REQ) is transmitted through the down bus 67D at step 81. The request is generated by setting the request bit in the cell shown in FIG. 5 to be "1".

Figure 7:
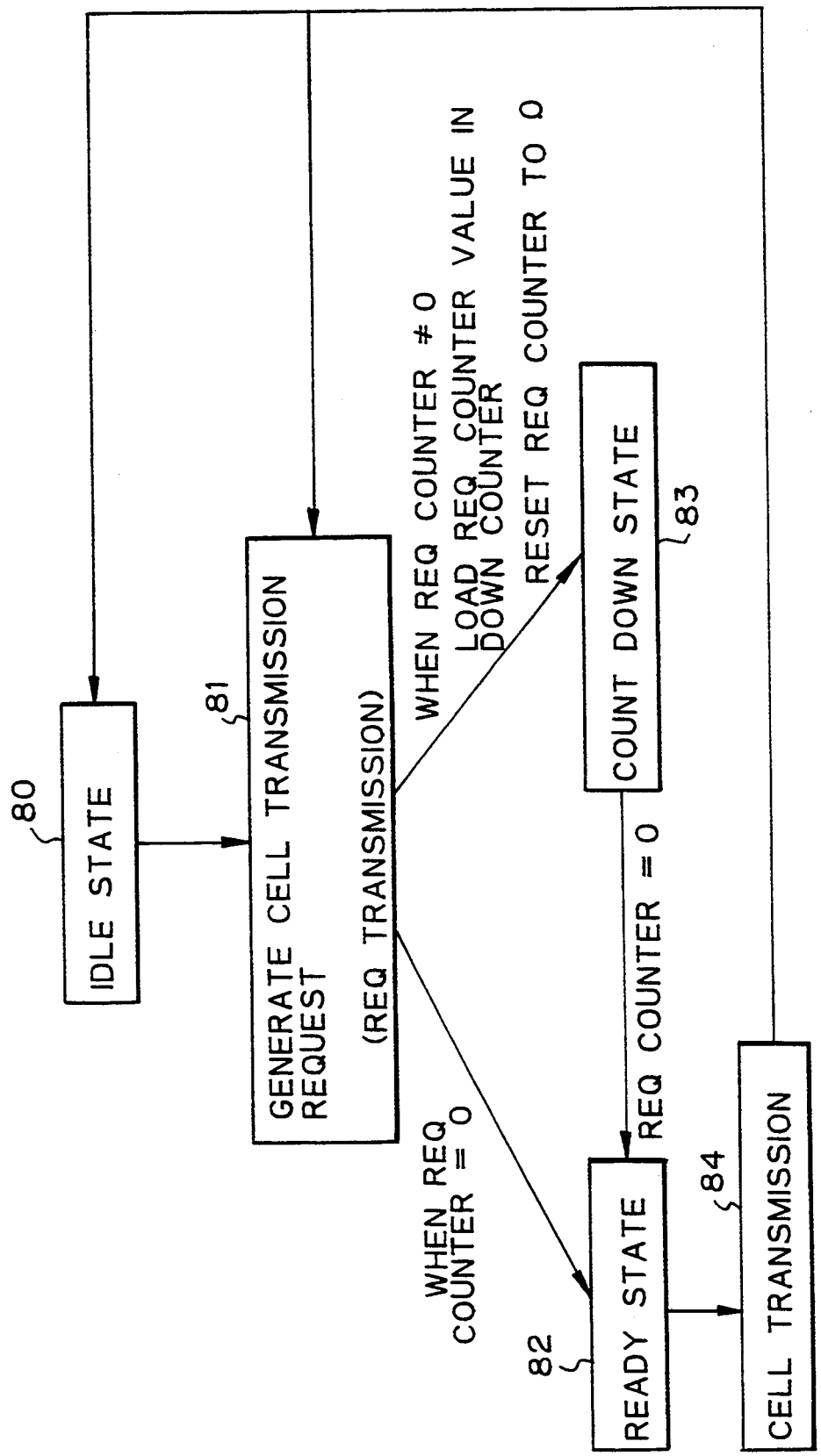
FIG. 7 is a state transition diagram in each terminal equipment or terminal adapter.

At this time, when the value of the request counter 661 is not zero, the value of the request counter is loaded in the down counter, the request counter is reset to be "0", and the process goes to a count-down state (83 in FIG. 7). If the value of the request counter is zero at step 81, the process goes to the ready state (82 in FIG. 7). When the process goes to the count down state, the down counter is decremented by "1" every time a busy bit of "0" in a cell passes through the up-signal bus 67U, and when the count value becomes "0", the process goes to the ready state 82. In the ready state, when a cell having a busy bit of reaches through the up-signal bus, the data to be transmitted is inserted into the cell and is transmitted (84 in FIG. 7).

The respective states in FIG. 7 are explained with reference to FIGS. 8A to 8C.

Figure 8A:
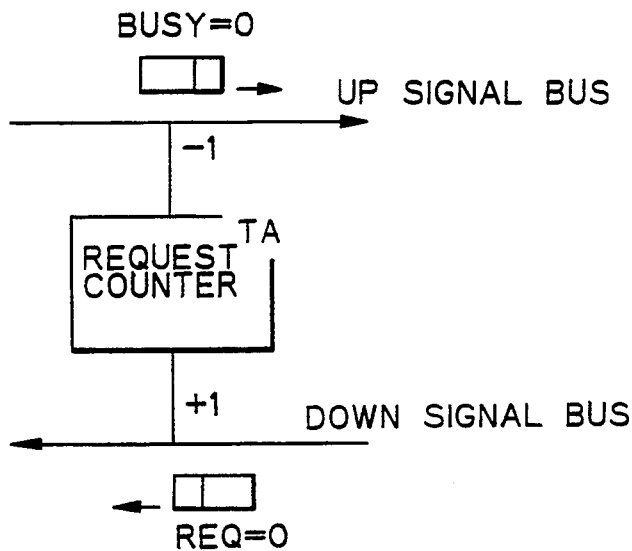
FIGS. 8A to 8C are diagrams for explaining the operation of a request counter and a down counter in each terminal equipment or terminal adapter.

FIG. 8A shows the operation of the request counter 661 during the idle state, in which the request counter 661 in the terminal equipment (TE) 66 counts up by "1" when a request bit of "1" passes through the down-signal bus 67D so that the number of the request bits transmitted from the-terminal equipments (TE) 66 on the side of the network terminator (NT) with respect to the terminal equipment (TE) 66 under consideration is counted. In the idle state, the request counter 661 also counts down by "1" when a cell having a busy bit of "0" passes through the up-signal bus 67U, so that the number of cells which have not been transmitted, but can be transmitted from the terminal equipments (TE) 66 on the network terminator (NT) side, is counted down. Therefore, the request counter 661 in the idle state 80 represents the number of cells which have been requested to be transmitted but have not yet been transmitted.

Figure 8B:
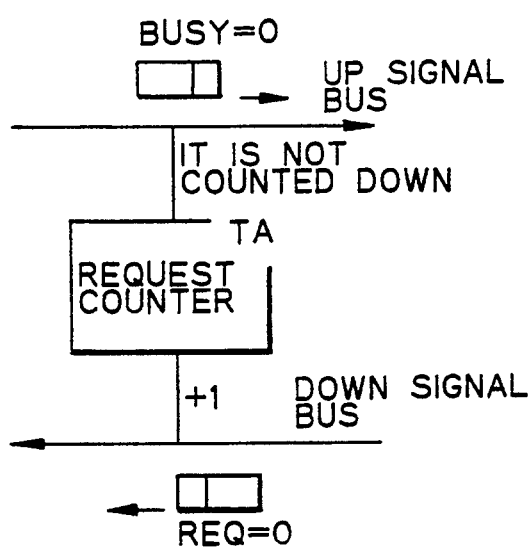

Next, FIG. 8B shows the operation of the request counter 661 in the count down state (83 in FIG. 7) and the ready state (82 in FIG. 7) after the request bit is transmitted from the terminal equipment (TE) 66 under consideration. In this state, the value of the request counter 661 is loaded into the down counter, and then the value of the request counter 661 is cleared to zero. In this state, the counting operation of the request counter is to how the number of request bits generated after the transmission of the request bit from the terminal equipment (TE) 66 under consideration, namely the distributed queue in the period between the generation of the request bit and the data transmission in the terminal equipment (TE) 66 under consideration. Therefore, the count up (+1) of the request counter is effected when a cell having a request bit of "1" passes through the down-signal bus, but the count down of the request counter is not effected even when a cell having a busy bit of "0" passes because it is prior to sending a cell from the terminal equipment (TE) 66 under consideration.

Figure 8C:
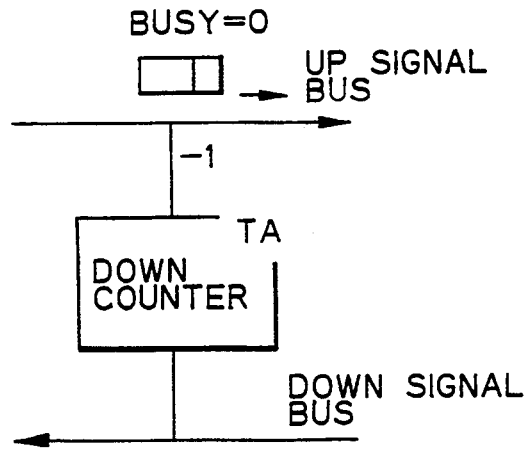

FIG. 8C shows the operation of the down counter 662 in the count down state (83 in FIG. 7) after the request bit is transmitted so that the value of the request counter 661 is loaded in the down counter 662. In this case, the down counter 662 counts down (−1) when a busy bit of "0" passes, and when the contents in the down counter 662 reaches "0", the busy bit ="1" is inserted into the busy bit area of the passing cell and data is inserted into the data area of the cell so that data is transmitted from the terminal equipment (TE) 66 under consideration.

By controlling as described above, a competition control for the terminal equipments (TE) 66 to access the bus 67 can be carried out with a small delay and without imbalance. Further, according to the embodiment of the present invention, since the request bits ="1" include the congestion relieving request signal, the terminal equipments (TE) 66 are restricted to transmit data. The advantage of the described embodiment of the present invention is that the network terminator (NT) needs not function to insert the busy bit ="1" into an empty cell, and therefore it can be made simple at a low cost.

FIG. 9 is a diagram showing the detailed construction of a local switch 62a according to an embodiment of the present invention.

In FIG. 9, 64a represents plural network terminator NT, 62a are an ATM local switch, 22 is subscriber line interfaces (SINF), 23-1 and 23-2 are multiplexing units (expressed by MUX), 24-1 and 24-2 are ATM switches, 25-1 and 25-2 are distributing units (expressed by DMUX), 26 are interfaces (FINF) between the local switch 62a and ATM exchanges in the ATM network, and 27 is congestion control unit which is the same as the congestion control unit 624 in FIG. 4.

The FINFs 26 are connected through transit lines, which are bidirectional transmission lines, to the other exchanges to transmit and receive data cells and control signals between exchanges. The data cells transmitted from the network terminator (NT) 64a are input through the subscriber lines to the SINF 22, multiplexed, in the MUX 23-1, with cells from a plurality of SINFs 22, switched, in the ATM switch 24-1 to the destination, the output thereof is output to the FINE 26 (or SINF 22) connected to the corresponding transit line via distributing unit 25-1. Cells transmitted from the other stations through the transit lines pass through the FINFs 26 to the multiplexing unit 23-2, are multiplexed therein, are switched by the ATM switch 24-2, are passed through the distributing unit 25-2, are output from the respective SINEs 22, and are transmitted from the SINF 22 to the respective NTs 64a.

When congestion relieving request signal is received from the other exchange, the signal is sent through the FINFs 26 to the congestion control unit 27. The congestion control unit 27 judges the request to relieve the congestion from the respective FINFs 26 to control the SINE 22 relating to the generation of the congestion to set the request bits at "1" with a predetermined ratio. The NT 20 and the not shown terminal equipment or the terminal adapter has the same construction as the conventional one to count the request bit ="1" as described before, thus the data transmitting cells are restricted.

FIG. 10 shows the construction of the SINE 22. In the figure, 220 is a line terminating unit, 221 is a switch (SW) interface, 222 is a request (REQ) 1 cell transmitting unit, and 223 is a VPI/VCI converting unit for converting a virtual path number of a cell output from the ATM switch and a virtual channel number from the values of the network side to the values of the network terminator (NT) side. In the SINE 22 in FIG. 9, a data cell output from the ATM switch 24-2 and the distributing unit 25-2 is transmitted to the subscriber line of the destination, and "1" is set in the request bit area in accordance with the instruction from the congestion control unit 27. Namely, when an instruction sent from the congestion control unit 27 (FIG. 9) to set the request bit at "1" is input, the request 1 cell transmitting unit 222 sets "1" in the second bit from the head of the header in the cell output from the distributing unit 25-2.

FIG. 11 shows a system construction of an ATM network which is a broad-band ISDN for explaining the second embodiment of the present invention. In FIG. 11, #1 to #3 are exchanges constituting nodes, 53 and 54 are local switches, 52 and 55 are NTs (network terminators), 50 and 56 are TAs (terminal adapters) connected to the respective NTs through DQDB protocol buses, and 51 and 57 are TEs (terminal equipments).

According to the second embodiment of the present invention, assume that plural exchanges, for example #1 and #2, in which congestions have occurred, simultaneously request to relieve the congestions with respective reduction ratios, for example 30% and 25% respectively, to the local switch 53 which accommodates a subscriber line from which cells are being transmitted to the congestion occurring in exchanges #1 and #2. Then the local switch 52 determines the request with the maximum reduction ratio from the relieving requests from the plurality of exchanges #1 and #2. In this case the ratio 30% is the maximum. Then, the local switch 52 inserts the request bits ="1" in cells to be transmitted to the down-subscriber line with the determined ratio. The cells are sent as they are from the network terminator in the customer station to the down bus 67D shown in FIG. 4. In each terminal equipment, the above-described counting operation of the request counter and the down counter is carried out in the same way as in the first embodiment, whereby the number of cells to be transmitted is restricted in accordance with the count value.

The above-described second embodiment of the present invention will be further described by referring back to FIG. 4.

When congestions occur in the other exchanges or in the local switch 62a, the relieving requests with respective congestion ratios are input from the other exchanges as control signals (control cells) or from the congestion control unit 624 in the local switch 62a into the relieving request determining unit 623. The relieving requests in this second embodiment are sent with figures representing the ratios indicating the percentage of cells that should be reduced from the current state. These ratios are compared in the relieving request determining unit 623 to determine the maximum ratio. The determined result is supplied to the request generating unit 621. The request generating unit 621 sets, at a frequency corresponding to the input ratio, "1" in the request bit areas in the cells to be transmitted from the transmitting unit 622. The network terminator (NT) 64a sends the the cells received through the down-subscriber line 41, as they are, i.e., logically without change, to the down-signal bus 67D in the customer station. Each terminal equipment 66 receives the cells passing through the down-signal bus 67D, and, when a request bit ="1" is detected in a cell, the request counter is counted up (+1). The cell is received by all of the terminal equipments in the customer station. When the contents in the request counter is not zero, even when the terminal equipment 66 requests to transmit data through the network terminal (NT) 64a to the local switch 62a, the terminal equipment 66 cannot transmit data until the contents in the request counter becomes zero. In the second embodiment, in accordance with the ratio of the generated cells having the request bits ="1", the ratio of the data transfer to the local switch 62a and to the other exchanges is restricted, whereby the congestion in the local switch 62a or in the other exchanges is relieved.

The operation flow of the second embodiment shown in FIG. 11 is explained with reference FIGS. 12 and 13. In the operation flow of the total system shown in FIG. 12, first, at step 121, when congestion occurs in a node, the node in which the congestion has occurred outputs a restriction request to the local switch 53 which is transmitting data to the node. The following example will be explained with reference to the example in FIG. 11. It is assumed that congestions occur in the nodes #1, #2, and the local switch 53; to relieve the congestions, the node #2 requests the local switch 53 to limit (to decrease) 25% of cells, the node #1 requests to limit 30% of the cells, and the local switch 53 requests to limit 10% of the cells.

In the local switch 53, at step 122, the maximum restriction request is selected. In the example of FIG. 11, the restriction requests from the respective nodes

1, #2, and the local switch are compared to select the maximum restriction request, namely the restriction request of 30%. In accordance with the maximum request, at step 123, a cell having a request bit ="1", which is the congestion relieving request signal, is transmitted through the designated subscriber down bus. The network terminator (NT) 52 transmits the contents of the cell as they are to the down-signal bus in the customer station. In the terminal adapter (TA) 50 or the terminal equipment (TE) 51 connected to the bus in the customer station effect the DQDB operation so that, at step 124, the request counter is counted up every time a cell having a request bit ="1" passes.

Then, in the up-signal bus, a cell having a busy bit ="0" transmitted from the local switch 53 passes through the network terminator (NT) 52 to the local switch. Since the cell does not have a destination, the cell is an invalid cell. Therefore, at step 125, the cell is discarded in the local switch 53, and is not transmitted to the exchange beyond the local switch 53. Accordingly, at step 126, the number of cells transmitted to all of the nodes (nodes #1 and #2) in which the congestions have occurred is made the same as requested or restricted more than the request, so that the congestions can be relieved. In this case, the congestion in the local switch 53 itself is also relieved.

The above-described congestion relieving system can be realized not only in the nodes in the network, but also in a processing unit (computer system) when a communication is effected through a network and the processing unit, and when the transmitted signals from the processing unit or the local switch must be restricted.

FIG. 13 is a process flow in the local switch 53 in which the number of cells transmitted from the terminal equipment (TE) or the terminal adapter (TA) is restricted. In FIG. 13, at step 131, the local switch 53 receives cell transmission restriction requests from plural nodes including the local switch 53. At step 132, the local switch 53 selects a restriction request with the maximum restriction rate. At step 133, the local switch 53 inserts Request bit ="1" into a cell and transmits the cell to the down subscriber line in accordance with the selected rate of the restriction.

In the above described embodiments of the present invention, it is necessary to previously send an empty cell from the network terminator (NT) to the up-signal bus. Therefore, there is the problem that, in the network terminator (NT), the cell generating unit 641 (FIG. 2 and FIG. 3) is still necessary for generating an empty cell in a predetermined frame.

The third embodiment of the present invention has an object to provide congestion relieving system in which the up-signal bus and the down-signal bus are connected at the far-most end of the bus, whereby the empty cell generating unit is not required in the network terminator (NT).

FIG. 14 is a diagram showing the third embodiment of the present invention.

In FIG. 14 and in FIG. 4, the same reference symbols represent the same parts. The only difference between FIG. 4 and FIG. 14 is that, in FIG. 14, the down-signal bus 6YD is connected at the end farthest from the network terminator (NT) 64b, to the up-signal bus 67U, and the network terminator 64b does not include the empty cell generating unit.

According to the third embodiment of the present invention, the down-signal bus 67D, which is sequentially connected to a plurality of terminal equipments (TE) 66 connected in parallel with respect to each other is also connected to the up-signal bus 67U, so that a cell transmitted through the down-signal bus 67D is used as an empty cell in the up-signal bus 67U, whereby the construction for generating an empty cell from the network terminator (NT) 64b to the up-signal bus 67U is not necessary.

The cell input from the local switch 62a to the network terminator (NT) 64b is sent to the down-signal bus 67D. Each cell 141 is sequentially transmitted through the down-signal bus 67D and the plurality of terminal equipments (TE) 66. The cell is received by a terminal equipment (TE) 66 which is the destination designated by the cell, and simultaneously the cell is transmitted to the down stream. The terminal equipment (TE) 66 which received the cell turns the busy bit in the cell 6 to "0" so that the data in the cell is deemed invalid after the destination received the data. After this, when each cell reaches the end of the down-signal bus 67D, it is directly input to the terminal equipment (TE) 66 at the upper most stream of the up-signal bus 67U because the down-signal bus 67D is folded and connected to the top end of the up-signal bus 67U. Then, the cell is transmitted sequentially-through the up-signal bus 67U.

Since the cell 141 on the down-signal bus 67D has already given any one of the terminal equipments (TE) 66 the data in the cell, the data in the cell 141 in the up-signal bus 67U is unnecessary data even when data remains in the cell 141. Accordingly, on the up-signal bus 67U, the cell is used as a cell having a busy bit ="0". In the competition control for the terminal equipments (TE) 66, the cell is used as an empty cell in the same way as in the above-described DQDB protocol so that the terminal equipment (TE) 66 which obtained the right to transmit data can write data to be transmitted into the cell and can transmit it to the network terminator (NT) 64b. Thus, in the network terminator (NT) 64b, there is no need to provide a-frame generating unit for generating an empty cell.

Figure 15:
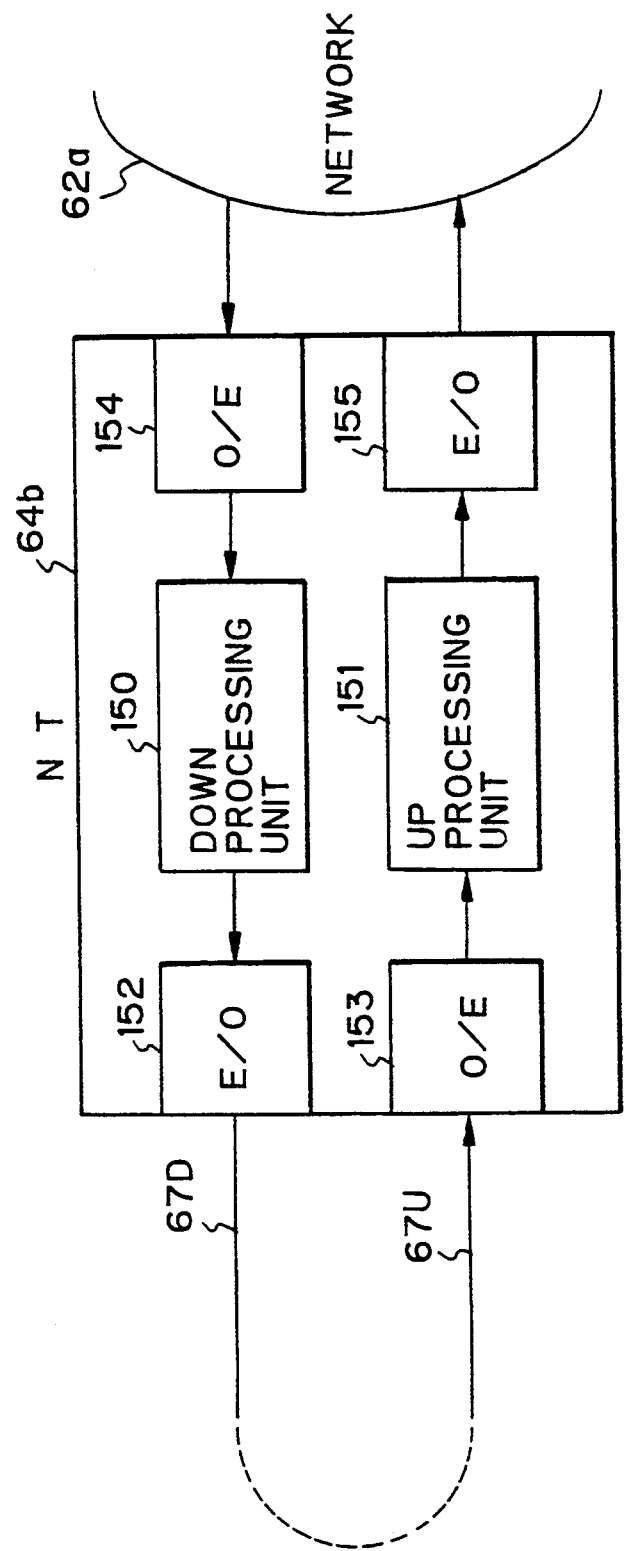
FIG. 15 is a diagram of a network terminator in the system shown in FIG. 14.

FIG. 15 is a diagram of the construction of the network terminator (NT) 64b according to the third embodiment of the present invention shown in FIG. 14.

In FIG. 15, the network terminator (NT) 64b includes a down processing unit 150, an up processing unit 151, electrical/optical converters (E/O) 152 and 155, and optical/electrical converters (O/E) 153 and 154. The other construction is the same as FIG. 3. Also, although it is omitted from the figure, a plurality of terminal adapters (TA) or terminal equipments (TE) are sequentially connected, in the same way as in FIG. 14, to the down-signal bus 67D and to the up-signal bus 67U.

In the construction shown in FIG. 15, the cell from the local switch 62a in the network side is input into the optical/electrical converter 154 in the network terminator (NT) 64b, processed by the down processing unit 150, and is transmitted from the electrical/optical converting unit 152 to the down-signal bus 67D. In the cell transmitted through the down-signal 67D and received by a terminal equipment (TE) which is the destination (not shown), the busy bit in the cell is rewritten to be "0", and then the data other than the busy bit in the cell appears as it is without change on the up stream of the up-signal bus 67U. After this, from a-terminal equipment (TE) 66 which has obtained the right to transmit after the bus competition control, the cell with transmitting data input therein is transmitted to the optical/electrical converter 153, and in the up processing unit 151, the cell having the busy bit ="1" is transmitted, as an optical signal, from the electrical/optical converter 155 to the local switch 62a at the network side.

In the above-described third embodiment with reference to FIGS. 14 and 15, to discriminate unnecessary cells, an example in which a busy bit ="0" is detected has been explained. As an alternative, VPI/VCI =all 0 may be detected. In this method, however, after data is delivered to the terminal equipment (TE), it is necessary to set the VPI/VCI in the cell to be all 0. Therefore, an additional construction is necessary to rewrite the VPI/VCI so that this is a disadvantage compared with the method to detect the busy bit ="0".

From the foregoing description, it will be apparent that, according to the present invention, in a broad band ISDN using a DQDB bus in a customer station and using ATM cells, without providing additional mechanism in the customer station, the cells can be restricted to transmit and the congestion can be relieved. Also, by applying the technique between nodes (between exchanges) in the network, the transmission from the other node can be restricted when congestion is generated. By this, the reliability of the broad band ISDN can be improved. Further, when a competition control system of DQDB is employed, it is not necessary to send an empty cell from a network terminator to an up-signal bus. Since it is not necessary to provide a cell generating unit in the network terminator, the the network terminator can be miniaturized at a low cost.

The principle of the present invention can be applied not only to the case in which data transmission from a local switch to a customer station is restricted but the case in which, between exchanges, the amount of transmitting cells from an exchange in congestion state to other exchange is restricted.

We claim:

1. A communication system for relieving congestion, comprising:
   a master device; and
   a customer station connected to said master device;
   wherein said customer station includes salve devices, each connected through an up-signal bus and a down-signal bus to said master device, said up-signal bus and said down-signal bus conformable with a DQDB protocol, and
   wherein said master device includes:
      congestion determining means for determining whether the congestion occurs in the communication system;
      congestion relieving signal generating means, operatively connected to said congestion determining means, for generating a congestion relieving signal when the congestion is detected by said congestion determining means; and
      cell transmitting means, operatively connected to said congestion relieving signal generating means, for transmitting a cell having a request bit area, where said congestion relieving signal is inserted, as a request bit, into the request bit area in said cell having a format conformable to said DQDB protocol, and said cell being transmitted from said cell transmitting means in said master device to said slave devices;
   whereby each of said slave devices transmits data under said DQDB protocol, when each of said salve devices receives said request bit.

2. A communication system for relieving congestion, comprising:
   a local switch; and
   a customer station including a network terminator connected to said local switch and data receiving/transmitting units connected to said network terminator through buses conformable to a DQDB protocol,
   wherein said local switch comprises:
      congestion determining means for determining whether the congestion occurs in the communication system;
      congestion relieving signal generating means, operatively connected to said congestion determining means, for generating a congestion relieving signal when the congestion is detected by said congestion determining means; and
      cell transmitting means, operatively connected to said congestion relieving signal generating means, for transmitting a cell having a request bit area, where said congestion relieving signal is inserted, as a request bit, into the request bit area in said cell having a format conformable to said DQDB protocol, and said cell being transmitted from said cell transmitting means in said local switch through said network terminator to said data receiving/transmitting units;
   whereby each of said data receiving/transmitting units transmits data under said DQDB protocol, when each of said data receiving/transmitting units receives said request bit.

3. A communication system as claimed in claim 2, wherein each of said data receiving/transmitting units comprises:
   request bit transmitting means for transmitting the request bit when one of said data receiving/transmitting units requests to transmit the data;
   busy bit transmitting means for transmitting a busy bit, said busy bit being inserted into a busy bit are in said cell when said one of said data transmitting/receiving units inserts the data into said cell, and said busy bit being removed from said cell when said cell is received by a destination;
   a request counter having contents, connected to said request bit transmitting means and counting up in response to the request bit transmitted through a down-signal bus from said network terminator to the one of said data receiving/transmitter units, and for counting down in response to an inverted busy bit transmitted through an up-signal bus from the one of the said data receiving/transmitting units, to s aid network terminator before the one of said data receiving/transmitting units transmits the request bit; and
   a down counter, connected to s aid request counter and loading the contents in said request counter as loaded contents when the one of said data receiving/transmitting units transmits said request bit, and counting down the loaded contents to zero in response to the inverted busy bit transmitted through said down-signal bus from s aid network terminator to the one of said data receiving/transmitting units;
   whereby, the one of said data receiving/transmitting units is restricted to transmit the data until the loaded contents in s aid down counter become zero.

4. A communication system as claimed in claim 3, wherein said cell is an ATM cell.

5. A communication system as claimed in claim 3, wherein said communication system is a broadband ISDN.

6. A communication system as claimed in claim 4, wherein said data receiving/transmitting units are terminal equipment having interfaces adapted to the ATM cell.

7. A communication system as claimed in claim 3, wherein said data receiving/transmitting units are terminal adapters having interfaces adapted to the ATM cell.

8. A communication system as claimed in claim 2, further comprising an exchange connected to said local switch generating congestion relieving requests identifying a ratio of cells to be restricted, wherein said local switch further comprises congestion control means for generating the congestion relieving request identifying the ratio of the cells to be restricted when the congestion occurs in said communication system, and wherein said congestion determining means comprises selecting means for selecting a maximum ratio among the ratio included in each of the congestion relieving requests receiving from said exchange and said congestion control means in said local switch, and said cell transmitting means in said local switch, and said cell transmitting means in said local switch comprises inserting means for inserting said congestion relieving signal into the cells with the maximum ratio.

9. A congestion relieving system as claimed in claim 2, wherein said buses include a down-signal bus transmitting the cell from said local switch and an up-signal bus, said down-signal bus sequentially connected to said data receiving/transmitting units, and connected to said up-signal bus, the cell transmitted by said down-signal bus being used as an empty cell in the up-signal bus.

10. A method of transmitting a first cell having a request bit from a local switch to a customer station by way of a down-signal bus conformable to a DQDB protocol and for receiving a second cell from the customer station by way of an up-signal bus conformable to the DQDB protocol, comprising the steps of:

generating a cell restriction signal under the DQDB protocol when the customer station is to be restricted from sending the second cell;

inserting the cell restriction signal as the request bit in the first cell; and transmitting the first cell to the customer station; and monitoring the request bit to control sending the second cell onto the up-signal bus.

11. A communication system for transmitting a first cell having a request bit from said communication system to a customer station via a down-signal bus conformable to a DQDB protocol and for receiving a second cell from the customer station via an up-signal bus conformable to the DQDB protocol, said communication system comprising:

congestion relieving means for generating a call restriction signal, when the customer station is restricted from sending the second cell; and cell transmitting means, operatively connected to said congestion relieving means, for inserting the cell restriction signal as the request bit in the first cell and for transmitting, under the DQDB protocol, the first cell to the customer station.

* * * * *

UNITED STATES PATENT AND TRADEMARK OFFICE
CERTIFICATE OF CORRECTION

Page 1 of 2

PATENT NO. : 5,341,373
DATED : August 23, 1994
INVENTOR(S) : Ryoichi ISHIBASHI et al.

It is certified that error appears in the above-indentified patent and that said Letters Patent is hereby corrected as shown below:

Col. 2,
Title Page, [57] Abstract, Line 7, change ", the" to --. The--.

Column 1,  Line 30, change "multiplication" to --transmission line--.

Lines 30 and 31, change "transmission line" to --multiplication--.

Column 2,  Line 54 and 55, after "restricted" insert --,--.

Column 5,  Line 31, after "that" delete "-".

Column 7,  Line 7, delete ".".
Line 11, change "Y" to --7--.
Line 17, change "6YD" to --67D--.
Line 64, after "of" insert --"O".

Column 8,  Line 27, change "how" to --know--.

Column 9,  Line 21, change "SINEs" to --SINFs--.
Line 35, change "SINE" to --SINF--.
Line 42, change "SINE" to --SINF--.

Column 11,  Line 63, change "6YD" to --67D--.

Column 12, Line 2, after "other" insert --,--.
Line 39, change "a-frame" to --a frame--.
Line 64, change "a-terminal" to --a terminal--.

UNITED STATES PATENT AND TRADEMARK OFFICE
CERTIFICATE OF CORRECTION

PATENT NO. : 5,341,373
DATED : August 23, 1994
INVENTOR(S) : Ryoichi ISHIBASHI et al.

It is certified that error appears in the above-indentified patent and that said Letters Patent is hereby corrected as shown below:

Column 13, Lines 41 and 66, change "salve" to --slave--.

Column 14, Lines 51, 54, 60 and 65, change "s aid" (all occurrences) to --said--.

Signed and Sealed this

Twenty-fourth Day of January, 1995

Attest:

BRUCE LEHMAN

*Attesting Officer*    *Commissioner of Patents and Trademarks*